United States Patent
Helmsderfer

[19]

[11] Patent Number: 5,564,463
[45] Date of Patent: Oct. 15, 1996

[54] COVER ASSEMBLY FOR COVERING UNDERSINK PIPING

[76] Inventor: John A. Helmsderfer, 1033 Windsor Ct., Cincinnati, Ohio 45206

[21] Appl. No.: 337,971

[22] Filed: Nov. 14, 1994

Related U.S. Application Data

[63] Continuation-in-part of Ser. No. 271,439, Jul. 7, 1994, which is a continuation-in-part of Ser. No. 146,999, Oct. 29, 1993, Pat. No. 5,341,830.

[51] Int. Cl.⁶ ..................... F16L 7/00; F16L 9/22
[52] U.S. Cl. .................. 137/375; 137/247.49; 138/160; 138/178; 285/47
[58] Field of Search ............... 137/247.49, 375; 138/155, 157, 158, 159, 160, 161, 178; 285/45, 47

[56] References Cited

U.S. PATENT DOCUMENTS

| | | | |
|---|---|---|---|
| 411,115 | 9/1889 | Wendell | 138/159 |
| 2,140,308 | 12/1938 | Belshaw | 285/47 X |
| 2,650,180 | 8/1953 | Walker | 137/375 |
| 2,761,949 | 9/1956 | Colton | 285/47 X |
| 2,841,203 | 7/1958 | Gronemeyer | 138/160 X |
| 2,937,662 | 5/1960 | Green | 285/47 |
| 3,014,827 | 12/1961 | Clinchy et al. | 138/161 |
| 3,153,546 | 10/1964 | Dunn | 285/47 X |
| 3,402,731 | 9/1968 | Martin | 137/375 |
| 3,559,694 | 2/1971 | Volberg | 285/47 X |
| 3,598,157 | 8/1971 | Farr et al. | 138/157 |
| 3,960,181 | 6/1976 | Baur et al. | 138/178 |
| 4,463,780 | 8/1984 | Schultz et al. | 138/178 |
| 4,473,244 | 9/1984 | Hill | 137/375 X |
| 4,516,278 | 5/1985 | Lamond | 4/679 |
| 4,595,615 | 6/1986 | Cohen | 138/155 X |
| 4,667,505 | 5/1987 | Sharp | 138/161 X |
| 4,669,509 | 6/1987 | Botsolas | 138/178 |
| 4,705,302 | 11/1987 | Beiley | 285/47 |
| 4,746,147 | 5/1988 | Walker | 285/47 X |
| 4,804,210 | 2/1989 | Hancock | 285/47 |
| 4,840,201 | 6/1989 | Botsolas | 138/178 |
| 5,054,513 | 10/1991 | Trueb et al. | 137/375 |
| 5,055,334 | 10/1991 | Lechuga | 137/375 X |
| 5,163,469 | 11/1992 | Trueb et al. | 137/375 |
| 5,183,299 | 2/1993 | Hallerstrom et al. | 285/47 |
| 5,259,410 | 11/1993 | Trueb et al. | 137/375 |
| 5,303,730 | 4/1994 | Trueb et al. | 137/375 |
| 5,341,830 | 8/1994 | Helmsderfer | 137/15 |
| 5,360,031 | 11/1994 | Trueb et al. | 137/375 |

FOREIGN PATENT DOCUMENTS

| | | |
|---|---|---|
| 1249974 | 2/1989 | Canada. |
| 4201 | 4/1899 | United Kingdom ................ 138/158 |

Primary Examiner—John Rivell
Attorney, Agent, or Firm—Wood, Herron & Evans, P.L.L.

[57] ABSTRACT

An insulative cover assembly for insulating a P-trap drain piping assembly comprises a unitary first cover piece having a generally elongated body terminating in an approximately 180° bend at the end of the body. The elongated body is longitudinally slit along its length for being positioned over the straight and J-shaped pipe sections of the P-trapped pipe assembly and is configured and dimensioned for continuously and simultaneously covering the joint straight and J-shaped pipe sections and the juncture therebetween. A second cover piece has a generally elongated body terminating in an approximately 90° bend at one end of the second cover piece. The second cover piece is longitudinally slit along its length to be positioned over the L-shaped pipe section of the P-trap assembly with a portion of the second cover piece body proximate the 90° bend configured for operable coupling with the first cover piece such that the first and second cover pieces provide complete insulative and protective coverage of the P-trap drain piping assembly.

21 Claims, 2 Drawing Sheets

COVER ASSEMBLY FOR COVERING UNDERSINK PIPING

This application is a continuation-in-part of pending application Ser. No. 08/271,439 entitled "Cover Assembly and Method for Covering Undersink Piping" and filed Jul. 7, 1994, which is a continuation-in-part of application Ser. No. 08/146,999 entitled "Cover Assembly and Method For Covering Undersink Piping" filed Oct. 29, 1993, which issued on Aug. 30, 1994 as U.S. Pat. No. 5,341,830, which application and patent are completely incorporated herein by reference in their entireties.

FIELD OF THE INVENTION

This invention relates generally to undersink piping such as P-trap drains and specifically discloses apparatuses for covering undersink piping so as to insulate the piping and to protect a person from abrasions and burns caused by contact with the piping.

BACKGROUND OF THE INVENTION

Conventionally, water which drains from a sink or basin, such as a restroom sink, travels through the drain opening of the sink and empties into undersink piping which directs the water from the sink into the building's waste water system. The undersink drain piping is referred to as a "P-trap" assembly and "P-trap" assemblies are common to many sinks, both commercial and residential. The conventional P-trap piping assembly includes a vertical or straight pipe section which extends downwardly from the sink drain opening and below the sink to a J-shaped pipe section. The J-shaped pipe section makes a 180° bend and then extends vertically upward to connect to an L-shaped pipe section which makes a 90° bend from the J-shaped section to extend generally horizontally into the wall to connect the P-trap with the waste water system of the building. The J-shaped portion serves the purpose of capturing or trapping any foreign objects which fall down the drain and which may become lodged in the waste water drainage system therefore clogging the system; hence the name "P-trap". Under the force of gravity, foreign objects sit in the bottom of the J-shaped section to be subsequently removed, such as by a plumber.

Current building regulations require that restroom facilities in a public building, such as restroom sinks, be accessible to all people, including physically disabled persons. Physically disabled persons, such as persons in wheelchairs, must often maneuver the chair partially under the sink to access it. Since the P-trap drain pipes protrude from the wall there is a risk of abrasions from the hard piping or even burns from the temperature of the water and piping to the legs of a person confined to a wheelchair. The current federal and state regulations regarding undersink piping, most notably the Americans With Disabilities Act (ADA), require that the P-trap and water supply piping be covered and insulated so as to protect a person using the sink from being burned or from incurring injuries from impact with the piping. As a result of these regulations, various methods and apparatuses have been utilized to try and adequately cover and insulate undersink P-traps and water supply piping. In the past, one of the more popular methods of insulation was to utilize loose foam insulation which was wrapped around the piping. However, traditional foam insulation usually fit poorly and was difficult to secure resulting in wasted time and frustration by the plumber or other installer. Furthermore, the foam wrap, due to its poor fit and inadequate securing means, was not very aesthetically pleasing in its appearance. Additionally, the ribbed construction of a wrapped pipe leaves ridges and cavities which trap dirt and other bacteria under the sink.

Various other methods and apparatuses have been utilized to cover a P-trap and supply piping beneath a sink as is evidenced by various patents in the field. However, besides often being ineffective, many of these other devices are still difficult and time consuming to secure and use, utilizing three or more covering pieces and requiring various fasteners and other securing means to hold the multiple insulation and covering pieces to the pipings. Further, the various pieces present a sectional look which affects the aesthetics of the cover, often a concern since the pipes and cover are exposed beneath a sing. Still further, the numerous pieces of some of the existing covers include various ridges, slits and/or openings on the cover pieces which have a tendency to trap dirt and other bacteria around the coverings and pipes. Such openings and slits may be inappropriate for use in sterile environments such as hospitals where trapped bacteria may lead to infection of persons using the facilities.

Accordingly, there is still a need for an improved simple and sanitary P-trap and supply pipe cover assembly which addresses the shortcomings of the existing devices and methods. It is, therefore, an object of the present invention to provide such an improved cover assembly which is quickly and easily installed, is aesthetically pleasing, and addresses the shortcomings of prior devices and is still effective to prevent a disabled person from being burned or bruised and cut by the undersink piping when using a sink.

SUMMARY OF THE INVENTION

The present invention accomplishes the desired objectives as discussed hereinabove by presenting an improved cover assembly for the P-trap drainage and supply pipes located under a sink which is relatively inexpensive and simple to manufacture, simple to install in a very short time, adequately secured to the piping when installed, and effective to prevent abrasions and burns, and aesthetically pleasing in appearance with a smooth, outer surface having minimal cavities or openings that might trap dirt and other bacteria.

To that end, the insulative cover assembly of the present invention comprises a unitary first cover piece having a generally elongated cylindrical body with a linear portion and terminating in an approximately 180° bend portion at one end thereof. The unitary elongated body of the first cover piece has a longitudinal slit along its length, and the body may be spread apart along the slit and positioned simultaneously over both the straight and the J-shaped pipe sections of a P-trap drain piping assembly, which are joined at a juncture by a pipe nut. The approximately 180° bend portion is positioned proximate the J-shaped pipe section to cover the pipe section. In accordance with the principles of the invention, the unitary body of the first cover piece is configured and dimensioned to continuously and simultaneously cover both the straight and J-shaped pipe sections, the juncture, and the associated pipe nut which joins the straight and J-shaped pipe sections at the juncture. Therefore, once the pipe sections have been fastened together, the unitary first cover piece of the invention is spread apart and placed thereover to cover and insulate the adjoining pipe sections continuously from proximate the drain opening of the sink to a position past the J-shaped pipe section. No collar structures or other similar overlapping structures are necessary in order to cover the pipe juncture between the straight and J-shaped pipe sections, which is the juncture most forward from the wall supporting the sink and is the juncture closest to a person's legs when the sink is accessed. As a result, the covering of the forward juncture is seamless, providing more effective insulation and a more aesthetic look at the juncture. Furthermore, the lack of a seam prevents accumulation of dirt and other contaminants at the forward pipe juncture.

A second cover piece has a generally elongated cylindrical body with a linear portion terminating in an approximately 90° bend portion at one end thereof. The elongated second cover piece body has a longitudinal slit along its length and may be spread apart along the slit and positioned over the L-shaped pipe section of a P-trap assembly. The L-shaped pipe section is joined at a juncture with an end of J-shaped pipe section, and a portion of the second cover piece of the invention is configured for operably coupling with a portion of the first cover piece body proximate that juncture such that the second cover piece completely covers the L-shaped pipe section, the juncture, and the respective pipe nut. Thereby, the first and second cover pieces provide complete insulative and protective coverage of the P-trap drain piping assembly. In a preferred embodiment of the invention, the second cover piece includes an increased diameter portion at an end thereof which overlaps with an end of the first cover piece to cover the pipe juncture between the J-shaped and L-shaped pipe section.

In a preferred embodiment, the first and second cover pieces include opposing flanges positioned on their respective linear portions on either side of the longitudinal slit. The flanges project radially outwardly from an outside wall of the cover pieces. Pairs of opposing apertures are formed within the flanges and appropriate fasteners, such as rivets, are positioned in the apertures to hold the flanges together and thus effectively seal the longitudinal slit along a portion of its length. Alternatively, each of the first and second cover pieces is dimensioned such that opposing edges along the longitudinal slit are overlappable, one with the other, for effectively sealing the slit along its length. Pairs of opposing apertures extend through both of the overlapped edges to hold the ends together. Preferably, longitudinal ribs are positioned adjacent the overlapped edges to space the edges from a pipe section and thus allow insertion of a fastener, such as a rivet, into the overlapped edges.

In one embodiment of the invention, the first cover piece has a first diameter over a majority of the length of the approximately 180° bend and increases at an end of the bend to a second diameter with is larger than the first diameter. The second diameter is maintained in the linear portion and is effective to cover the pipe nut at the juncture joining the straight and J-shaped pipe sections. The first cover piece body maintains the second diameter over the linear portion of its length and thus provides simultaneous and continuous coverage of both the straight pipe piece, the J-shaped pipe piece and the forward juncture of the undersink piping.

In an alternative embodiment, the first cover piece maintains a generally uniform diameter over its entire effective length to simultaneously and continuously cover the straight and L-shaped pipe sections and the respective pipe nut of the forward juncture. In still a further alternative embodiment, the first cover piece increases to a second diameter from the first diameter of the approximately 180° bend portion in order to cover the pipe nut and forward juncture and then decreases from the second diameter to a third diameter at a positioned spaced from an end of the approximately 180° bend portion.

In a preferred embodiment of the present invention, both the first and second cover pieces comprise a plurality of longitudinal ribs which extend along a major portion of the length of the body of each cover piece. The ribs extend radially inwardly from an inner wall of the body and engage a covered pipe section to effectively prevent shifting of the cover pieces on the various pipe sections when the diameter of the cover piece is greater than the pipe diameter such that the cover pieces will tend to shift.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
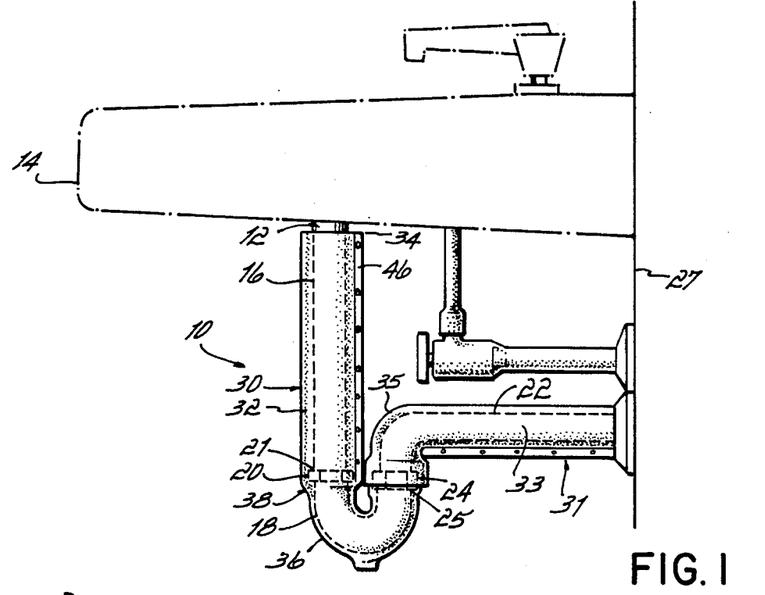
FIG. 1 is a side view of an embodiment of the insulative cover assembly of the present invention as installed on undersink P-trap drain piping.

FIG. 1 illustrates the insulative cover assembly 10 of the present invention as installed on P-trap drain piping 12 underneath a sink 14. The insulative cover assembly 10 is positioned on drain piping 12 in order to cover and insulate the piping and reduce or prevent burns and abrasions of a handicapped person coming into contact with the piping. The drain piping 12 under sink 14 is essentially divided into three pipe sections shown in dash line. A straight pipe section 16 extends downwardly from the sink drain (not shown) and attaches to one side of a J-shaped pipe section or "trap" pipe section, which is attached to straight section 16 by a pipe nut 20 at the juncture 21 between the pipe sections 16, 18. An L-shaped pipe section 22 is joined to the other side of the J-shaped pipe section 18 by a pipe nut 24 at juncture 25. The L-shaped pipe section extends back into the wall to dispose of waste water draining from sink 14. Juncture 21 is the forwardmost juncture from the wall 27 supporting sink 14 and piping 12 and thus is referred to herein as a forward juncture. Juncture 25 is a rearward juncture.

The insulative cover assembly 10 includes a unitary first cover piece 30. First cover piece 30 has a generally elongated cylindrical body with a generally linear portion 32 comprising a substantial portion of its length. When the first cover piece is placed over pipe sections of the drain piping assembly 12, a first end 34 of linear portion 32 abuts generally against the drain of sink 14 (see FIG. 1). The body of the first cover piece 30 terminates in an approximately 180° bend portion 36 which extends from a second end 38 of the linear portion 32. The cylindrical first cover piece 30 has a longitudinal slit 40 along its length from the first end 34 of linear portion 32 to an end 39 of the bend portion 36 (see FIG. 2.)

Figures 2, 4, 5:
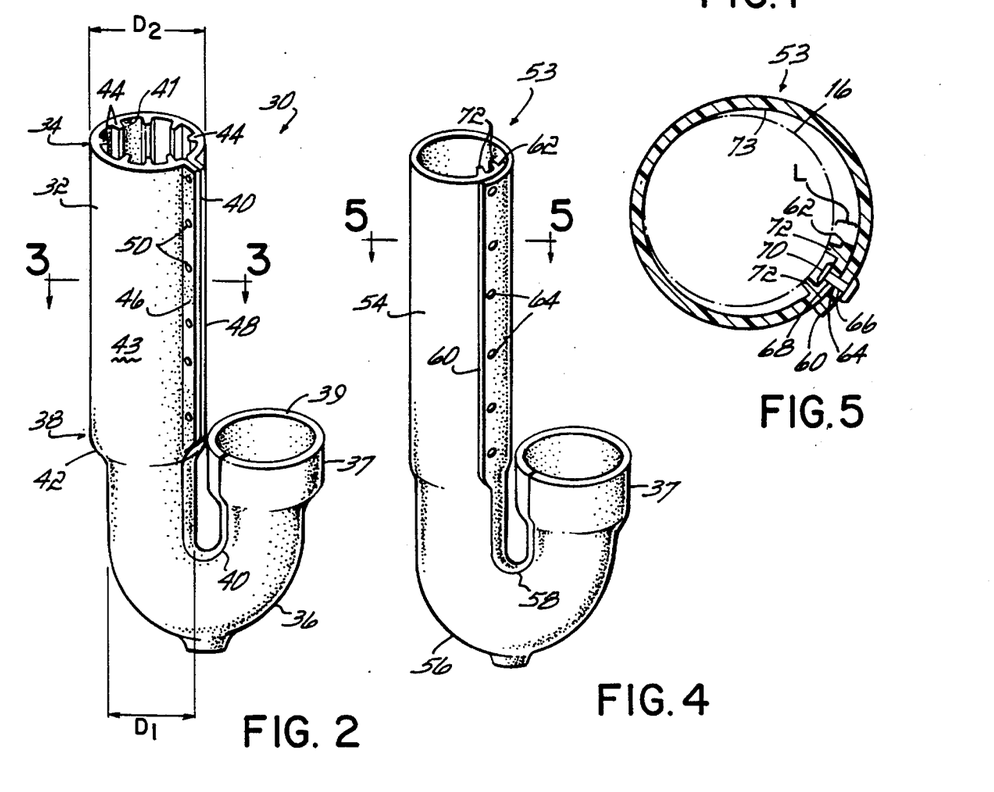
FIG. 2 is a perspective view of a first piece of the insulative cover assembly illustrated in FIG. 1.
FIG. 4 is a perspective view of an alternative embodiment of a first piece of the insulative cover assembly.
FIG. 5 is a cross-sectional view along lines 5—5 of FIG. 4.

FIG. 2 is a perspective view of the first cover piece 30 illustrated in FIG. 1. The longitudinal slit 40 allows the first cover piece 30, including bend portion 36, to be spread apart and simultaneously positioned over the straight and J-shaped pipe sections 16, 18 of the piping assembly 12. As illustrated in FIGS. 1 and 2, bend portion 36 of the first cover piece 30 is configured with a diameter $D_1$ which is generally close to the diameter of the J-shaped pipe section 18 such that there is very little room for the bend portion 36 to move or shift on the J-shaped pipe section 18 when cover assembly 10 is installed. However, the J-shaped pipe section 18 is joined to straight pipe section 16 by pipe nut 20, which has a larger diameter than both the J-shaped pipe section 18 and the straight pipe section 16. Straight pipe section 16 usually maintains a diameter similar to the diameter of the J-shaped pipe section 18.

In accordance with the present invention, linear portion 32 of the first cover piece 30 increases to a diameter $D_2$ at a transition region 42 proximate juncture 21. Linear portion 32 preferably increases from the first diameter $D_1$ of the 180° bend portion to a larger second diameter $D_2$, which is dimensioned to allow the first cover piece 30 to be positioned over the larger diameter pipe nut 20 so that cover piece 30 simultaneously and continuously covers pipe sections 16, 18 and juncture 21. The first cover piece 30 increases in diameter at a position proximate juncture 21 and preferably at a position along the 180° bend portion 36 prior to juncture 21, such as at end 38 of the linear portion 32. Linear portion 32 maintains the increased diameter from transition region 42 and end 38 up to the end 34. In a preferred embodiment of the invention, transition region 42 is gradually increased in diameter from the bend portion 36 to the linear portion 32 to give a smooth appearance.

Figure 3:
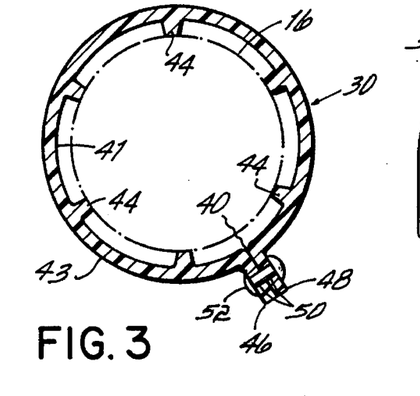
FIG. 3 is a cross-sectional view along lines 3—3 of FIG. 2 illustrating the longitudinal ribs of an embodiment of the present invention.

Since the first cover piece 30 maintains diameter $D_2$ above juncture 21, the first cover piece 30 may have a tendency to shift or move around with respect to piping assembly 12. To reduce and effectively prevent such shifting, the first cover piece 30 is preferably configured with stand-off structures, such as longitudinal ribs 44, which extend from end 34 generally to the sloped transition region 42. As illustrated in FIG. 3, the ribs 44 project radially inwardly from an inside wall 4 land abut against straight pipe section 16 to prevent shifting of the first cover piece 30. Ribs 44 may be continuous from end 34 to transition region 42. Alternatively, the ribs may extend in sections with spaced gaps (not shown) in the ribs. Still further, the stand-off structures might be randomly spaced around the inside wall 41. Either way, the ribs ensure a more rigid, secure cover assembly which adequately covers the piping and produces an aesthetically pleasing appearance.

As illustrated in FIG. 1, a second cover piece 31 covers the L-shaped pipe section 22. Second cover piece 31 has a generally cylindrical body including linear portion 33 and terminating in an approximately 90° bend portion 35. The 90° bend portion 35 couples with end 39 of the first cover piece to cover juncture 25 and thus provide complete insulation of pipe assembly 12 as described in greater detail hereinbelow.

In a preferred embodiment of the present invention, the first cover piece 30 has opposing flanges 46, 48 which are positioned on either side of the longitudinal slit 40. Flanges 46, 48 project generally perpendicularly from an outside wall 43 of the linear portion 32 of the first cover piece body and extend from proximate end 34 generally down to end 38 at a position proximate the transition region 42. The purpose of the flanges 46, 48 is to hold the first cover piece 30 together along the longitudinal slit 40. The first cover piece 30 is spread apart along slit 40 to be placed simultaneously around the straight and J-shaped pipe sections 16, 18, respectively. When the first cover piece 30 is properly situated around the pipe sections, the flanges 46, 48 are aligned and may be secured together to effectively seal the slit 40 along a portion of its length, i.e., along the length of linear portion 32. Preferably, pairs of opposing apertures 50 are formed in the flanges 46, 48, and a suitable fastener 52, such as a rivet-like structure, is placed in each aperture 50 to hold the flanges 46, 48 together (see FIG. 3).

FIG. 4 illustrates an alternative embodiment of the first cover piece 30 of the cover assembly 10 of the present invention. The first cover piece 53 includes a generally elongated cylindrical body with a linear portion 54 and terminating in an approximately 180° bend portion 56 at one end of the linear portion 54 similar to first cover piece 30. Furthermore, the diameter of the generally elongated cylindrical body increases from a first diameter of the 180° bend portion 56 to a larger second diameter along the length of the linear portion 54. First cover piece 53 also includes a longitudinal slit 58 which allows the body of the first cover piece 53 to be spread apart and placed around the respective pipe sections 16, 18. Along the linear portion 54, the longitudinal slit 58 creates opposing, parallel edges 60, 62 as illustrated in FIG. 5. In an alternative embodiment of the invention, pairs of opposing apertures 64 are formed along the edges 60, 62.

As illustrated in FIG. 5, each aperture pair 64 includes an aperture 66 formed proximate edge 60 and an aperture 68 formed proximate edge 62. After cover piece 53 has been placed over the respective pipe sections 16, 18, the edges 60, 62 are sealed together to seal the longitudinal slit 58 along linear portion 54 of cover piece 53. To seal the edges 60, 62 together, edge 60 is overlapped over edge 62 such that apertures 66 and 68 are aligned. A fastening structure 70, such as a rivet-like structure, is positioned in the apertures 66, 68 to hold the linear portion 54 of the first cover piece together along the overlapped edges 60, 62. As seen in FIG. 5, the overlapping edges 60, 62 decrease the effective diameter of the linear portion 54. This effectively reduces the amount of shifting of the first cover piece 53 on the pipe sections, and specifically reduces shifting of linear portion 54 on straight pipe section 16.

To further reduce shifting of cover piece 53 and to insure that there is adequate clearance for the fastener 70 to extend through apertures 66 and 68, the first cover piece 53 preferably includes stand-off structures. The cover piece preferably includes at least a pair of longitudinal ribs 72 proximate slit 58. Rib pair 72 is positioned proximate edge 62 which is the underlying edge as illustrated in FIG. 5. The opposing ribs 72 preferably extend along the linear portion 54, one rib on either side of the apertures 68 formed proximate edge 62. As best seen in FIG. 5, the pair of ribs 72 project radially inwardly from inner wall 73 and abut against straight pipe section 16 to prevent shifting of body 54 on the pipe section. Furthermore, the ribs 72 are dimensioned in length L to provide a stand-off distance for the overlapped edges 60, 62 so that fasteners 70 may fit through the respective apertures 66, 68 without being blocked by pipe section 16. Again, other suitable stand-off structures might be utilized. Therefore, the overlapped edges 60, 62 insure that the pipe sections 16, 18 are completely covered by the first cover piece 53 and are adequately insulated, and that the first cover piece 53 is adequately affixed to the respective pipe sections. As illustrated in FIG. 4, the first cover piece 53 includes a linear portion 54 of larger diameter the bend portion 56. The larger diameter of linear portion 54 ensures that edges 60, 62 can overlap properly along the length of the linear portion 54.

Figure 6A:
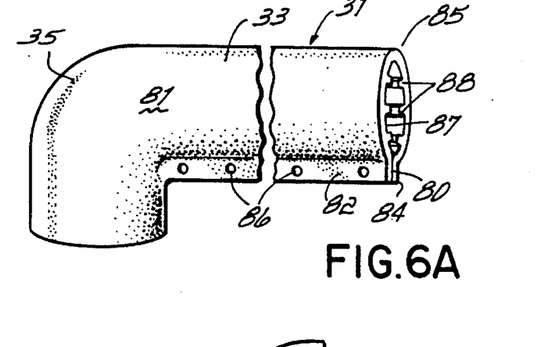
FIG. 6A is a side, perspective view of a second cover piece of the present invention.

As discussed above, insulative cover assembly 10 also includes a second cover piece 31 having a generally elongated cylindrical body with a linear portion 33 terminating in an approximately 90° bend portion 35 at one end of the second cover piece 31. Referring to FIG. 6A, second cover piece 31 also includes a longitudinal slit 80 along its length. Longitudinal slit 80 allows the body of second cover piece 31 to be spread apart along the slit so that the cover piece may be placed over the respective pipe sections, such as the L-shaped pipe section 22 illustrated in FIG. 1. In an embodiment of the second cover piece 31, opposing flanges 82, 84 project generally perpendicularly from an outside wall 81 of the linear portion 33 along the body from end 85 to a position proximate the 90° bend portion 35. Similar to the flanges illustrated in FIG. 2, flanges 82, 84 preferably include pairs of opposing apertures 86 which receive fasteners, to hold the flanges 82, 84 together and seal slit 80 generally along the length of the linear portion 33. Alternatively, an overlapping sealing structure such as that illustrated in FIG. 4 might be utilized with second cover piece 31.

Preferably the second cover piece 31 also includes longitudinal ribs 88 extending radially inwardly of inner wall 87 preferably from the cover piece end 85 to a position proximate 90° bend portion 35. Similarly to ribs 44 in the first cover piece 30, ribs 88 abut against a pip sections, i.e. the L-shaped pipe section 22, and effectively prevent the second cover piece 31 from shifting substantially on the pipe section.

Figure 6B:
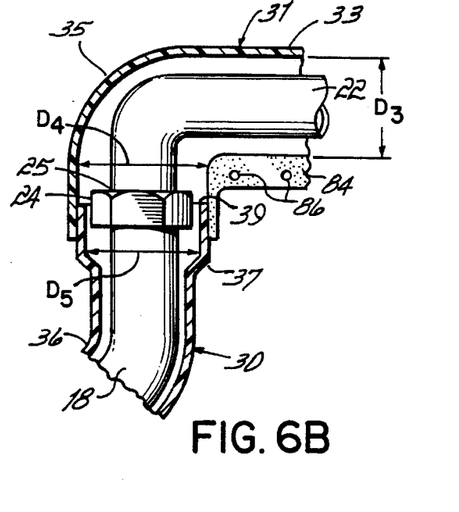
FIG. 6B is a cross-sectional view of the coupling of the first and second pieces of the invention at a pipe juncture.

As illustrated in FIG. 6B, second cover piece 31 maintains a generally constant diameter $D_3$ along a substantial portion of its length including linear portion 33. However, proximate bend portion 35, the second cover piece 31 preferably increases to a larger diameter $D_4$ to accommodate pipe nut 24 when the L-shaped pipe section 22 and J-shaped pipe section 18 are connected together at juncture 25. The second cover piece 31 maintains diameter $D_4$ generally along the length of the bend portion 35. In a preferred embodiment of the invention, the first cover piece 30 includes a collar portion 37 proximate an end of the bend portion 35. Collar 37 has a diameter $D_5$ expanded to be larger than the diameter of the 180° bend portion 36 of the first cover piece 30. As illustrated in FIG. 6B, when the first cover piece 30 is positioned simultaneously around both the straight and J-shaped pipe sections 16, 18, respectively, the larger diameter collar 37 is positioned around juncture 25 and the respective pipe nut 24. The 90° bend portion 35 of the second cover piece 31 preferably has a diameter $D_4$ which is larger than the diameter of collar 37 ($D_4>D_5$). Therefore, when the first and second cover pieces are simultaneously placed on the drain piping assembly 12, 90° bend portion 35 overlaps collar 37 to couple the first and second cover pieces together and form a complete cover at juncture 25 as illustrated in FIG. 6B. Alternatively, collar 37 might be dimensioned larger in diameter than 90° bend portion 35 ($D_5>D_4$) which will allow collar 37 to overlap ben portion 36. Therefore, the first and second cover pieces of the present invention are operably coupled together to cooperate and completely cover and insulate an undersink drain piping assembly 12 to protect persons, such as handicapped persons, from being burned or abraded by the pipe assembly. The first cover piece 30 is a unitary piece which is simultaneously positioned over both the straight pipe section 16 and the J-shaped pipe section 18. The simultaneous coverage of both pipe sections provides a continuous coverage of juncture 21 and eliminates the need for overlapping collar structures or other collar structures at pipe juncture 21. This reduces the amount of time necessary to install the insulative cover assembly 10 of the present invention, and thus, reduces the cost of installation. Furthermore, the unitary first cover piece eliminates any openings at forward juncture 21 and thus, reduces the risk of an exposed juncture and the accumulation of dirt and other contaminants at the forward juncture.

Figure 7:
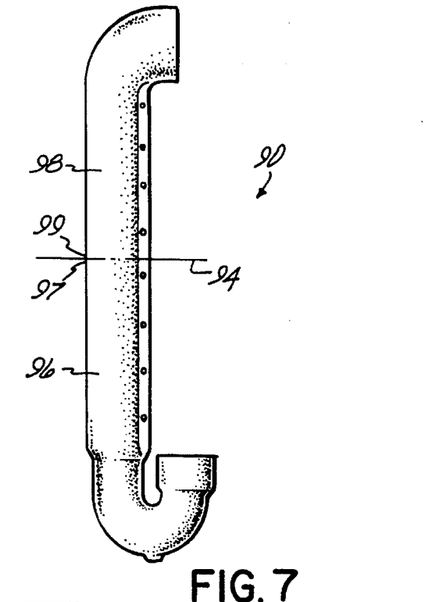
FIG. 7 is a side view of an embodiment of the cover assembly of the invention manufactured as a unitary article.

FIG. 7 illustrates one preferred embodiment of the present invention in which both the first and second cover pieces are formed as a unitary piece 90. Unitary piece 90 provides a unit which is readily shippable as a single piece without requiring further packaging of miscellaneous pieces together, thus reducing the space needed to ship the present invention, reducing the complexity of any supplemental packaging structures and thus reducing the overall cost of shipment. Prior to installation, the length of the straight pipe section 16 from sink 14 and the length of the L-shaped pipe section 22 from wall 27 are measured. After measuring, the unitary piece 90 is severed such as at line 94 to produce a first cover piece 96 and second cover piece 98 of the present invention. If necessary, the ends 97, 99 of the respective first and second cover pieces 96, 98 might also be trimmed after severance in order to ensure the alignment of the overlapping ends of the pieces 96, 90 and to provide a more proper fit beneath sink 14 and against wall 27, respectively. The unitary piece 90 of FIG. 7 may be molded as a single unit, thus reducing time and costs associated with forming the insulative cover assembly of the present invention and resulting in further cost savings. When the first and second cover pieces are formed together, the diameter $D_3$ of the linear portion of the second cover piece 31 (FIG. 6B) is essentially the same diameter as the diameter $D_2$ (FIG. 2) of the linear portion 32 of the first cover piece 30 (i.e.. $D_2=D_3$). Although one or both of the linear portions of cover pieces 96, 98 might be tapered in diameter according to the principles of the present invention as discussed herein. For example, the unitary pieces 90 shown in FIG. 7 will produce the first and second cover pieces as illustrated in FIGS. 2 and 6A. However, other unitary pieces might be formed to yield cover pieces like those shown in FIGS. 4, 8 and 9.

Figure 8:
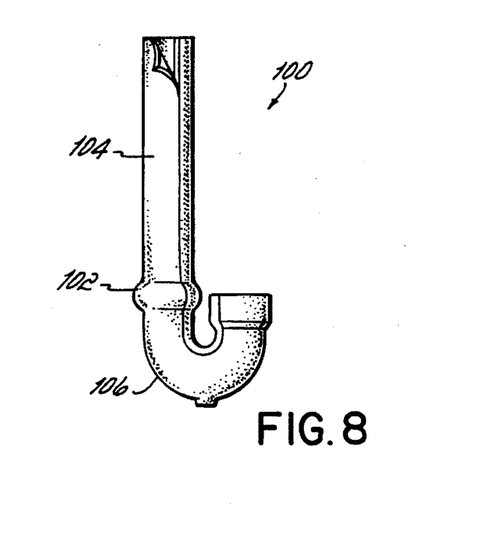
FIG. 8 is another alternative embodiment of a first piece of the insulative cover assembly.
Figure 9:
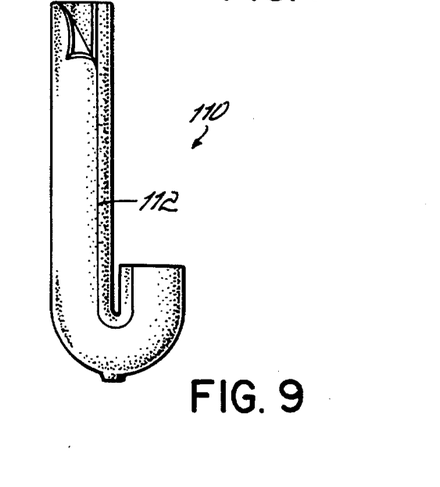
FIG. 9 is another alternative embodiment of a first piece of the insulative cover assembly.

FIGS. 8 and 9 illustrate alternative embodiments of the first cover piece of the present invention. FIG. 8 illustrates a first cover piece 100, which includes a flared portion 102 between linear portion 104 and 180° bend portion 106. Flared portion 102 generally maintains a larger diameter than the diameter of the remaining portions 104, 106 of the first cover piece 100. Flared portion 102 accommodates the larger diameter of pipe nut 20 when first cover piece 100 is positioned simultaneously over the straight pipe section 16 and the J-shaped pipe section 18 (see FIG. 1). In accordance with the principles of the present invention, cover piece 102 is slit along its length by a longitudinal slit 108 to be spread apart and positioned over pipe sections 16, 18.

Alternatively, the first cover piece 110 illustrated in FIG. 9 has a generally cylindrical body which maintains a generally uniform diameter along its entire length. First cover piece 110 is formed such that the effective inner diameter of the piece body is essentially larger than the diameter of the pipe nut 21. Accordingly, no flared portions or portions of increased diameter are necessary as the first cover piece 110 may accommodate a pipe nut essentially anywhere along its length. First cover body 110 is slit along its length by longitudinal slit 112. The first cover pieces 100 and 110 may include opposing flanges with pairs of opposing apertures as illustrated in FIG. 2 for securing the cover pieces to the respective pipe sections. Alternatively, the cover pieces 100, 110 might be configured to have overlapping ends as illustrated in the embodiment of FIG. 4. Still further, cover pieces 100, 110 might also utilize longitudinal ribs to prevent shifting of the cover pieces on the respective pipe sections as illustrated in FIG. 2. Cover piece 110, especially, would be prone to shifting and would be suitable for the longitudinal ribs of the present invention.

While the cover pieces 100, 110 are shown as separate cover pieces to be used with a respective second cover piece to completely insulate an undersink P-trap assembly, the pieces 100, 110 may be formed with a respective second cover piece as a single unit as disclosed herein and illustrated in FIG. 7.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An insulative cover assembly for insulating a P-trap drain piping assembly located under a sink including a straight pipe section, a J-shaped pipe section, and an L-shaped pipe section joined together at junctures by pipe nuts, the cover assembly comprising:

a unitary first cover piece having a generally elongated body with a cylindrical cross section and terminating in an approximately 180° bend at one end of said body, said elongated body being longitudinally slit along its length for being spread apart and positioned over said straight and J-shaped pipe sections joined at a juncture with said approximately 180° bend proximate said J-shaped pipe section;

the body of the unitary first cover piece being configured and dimensioned for continuously and simultaneously covering the joined straight and J-shaped pipe sections, the juncture and an associated pipe nut;

a second cover piece having a generally elongated body with a cylindrical cross section and terminating in an approximately 90° bend at one end of said second cover piece body, said elongated second cover piece body being longitudinally slit along its length for being spread apart and positioned over said L-shaped pipe section joined at a juncture with an end of said J-shaped pipe section, a portion of said second cover piece body proximate the 90° bend configured for operably coupling with a portion of said first cover piece body proximate the 180° bend such that the second cover piece completely covers the L-shaped pipe section, the juncture between the L-shaped pipe section and the J-shaped pipe section and the respective pipe nut;

whereby the first and second cover pieces provide complete insulative and protective coverage of the P-trap drain piping assembly.

2. The insulative cover assembly of claim 1 wherein the body of said first cover piece has a generally uniform diameter over effectively its entire length to adequately cover the juncture between the straight and L-shaped pipe sections and the respective pipe nut.

3. The insulative cover assembly of claim 1 wherein the first cover piece body has a first diameter over a majority of the length of the 180° bend, said body increasing in diameter, at an end of the 180° bend, to a second diameter which is larger than said first diameter for covering the pipe nut at the juncture joining the straight and J-shaped pipe sections, said first cover piece body maintaining said second diameter over a portion of the body length.

4. The insulative cover assembly of claim 1 wherein the first cover piece body has a first diameter over a majority of the length of the 180° bend, said body increasing in diameter, at an end of the 180° bend, to a second diameter which is larger than said first diameter for covering the pipe nut at the juncture joining the straight and J-shaped pipe sections, said first cover piece body decreasing from said second diameter to a third diameter smaller than the second diameter at a position spaced from said end of the 180° bend.

5. The insulative cover assembly of claim 1 wherein said first cover piece body further comprises a plurality of stand-off structures extending radially inwardly from an inner wall of the cylindrical body for engaging a pipe section covered by the first cover piece.

6. The insulative cover assembly of claim 1 wherein said first cover piece body further comprises a plurality of longitudinal ribs extending along a portion of the body, said ribs extending radially inwardly from an inner wall of the cylindrical body for engaging a pipe section covered by the first cover piece.

7. The insulative cover assembly of claim 1 further comprising elongated opposing edges adjacent a portion of the first cover piece slit, said first cover piece body dimensioned such that said edges are overlappable, one with the other, for sealing the slit along said slit portion to cover the pipe sections and secure the first cover piece to the pipe sections.

8. The insulative cover assembly of claim 7 further comprising a fastener for extending into said overlappable edges when they are overlapped to hold the edges together to seal a portion of the slit.

9. The insulative cover assembly of claim 7 wherein said first cover piece body further comprises a stand-off structure extending radially inwardly from an inner wall of the cylindrical body such that when the edges are overlapped the stand-off structure extends from an innermost overlapped edge for engaging the covered pipe sections and spacing said overlapped edges from the pipe sections.

10. The insulative cover assembly of claim 7 further comprising at least one longitudinal rib extending lengthwise along said slit portion and extending radially inwardly from an edge such that when the edges are overlapped the rib extends from an innermost overlapped edge for engaging the covered pipe sections and spacing said overlapped edges from the pipe sections.

11. The insulative cover assembly of claim 1 further comprising a pair of opposing flanges, each flange adjacent an opposite side of the first cover piece longitudinal slit, said flanges being configured to be secured together to hold the first cover piece together along the slit and effectively seal said slit along a portion of its length to cover the pipe sections with said first cover piece.

12. The insulative cover assembly of claim 11 further comprising at least one pair of opposing apertures, one aperture of the pair positioned on each of said opposing flanges and aligned to receive a securing device to secure said flanges together along a portion of said slit.

13. The insulative cover assembly of claim 1 further comprising a pair of opposing flanges, each flange adjacent an opposite side of the second cover piece longitudinal slit, said flanges being configured to be secured together to hold the second cover piece together along the slit and effectively seal said slit along a portion of its length to cover the pipe sections with said second cover piece.

14. The insulative cover assembly of claim 1 wherein said second cover piece body further comprises a plurality of stand-off structures extending radially inwardly from an inner wall of the cylindrical body for engaging a pipe section covered by the second cover piece.

15. The insulative cover assembly of claim 1 wherein said second cover piece body further comprises a plurality of longitudinal ribs extending along a portion of the body, said ribs extending radially inwardly from an inner wall of the cylindrical body for engaging a pipe section covered by the second cover piece.

16. The insulative cover assembly of claim 1 wherein said second cover piece body includes an expanded diameter portion proximate the 90° bend, said expanded diameter portion configured to overlap an end portion of said first cover piece body proximate the 180° bend to couple said first and second cover together over the juncture between the L-shaped pipe section and the J-shaped pipe section to completely cover the pipe sections.

17. An insulative cover assembly for insulating a pipe section of a P-trap drain piping assembly located under a sink including a straight pipe section, a J-shaped pipe section, and an L-shaped pipe section joined together at junctures by pipe nuts, the cover assembly comprising:

a cover piece having a body with a generally cylindrical cross section, the body being configured for positioning over at least one of the straight pipe section, J-shaped pipe section, and L-shaped pipe section, said body being longitudinally slit along its length for being spread apart and positioned over the pipe section;

the body including opposing edges adjacent a portion of said longitudinal slit, said cover piece body dimensioned such that said opposing edges are overlappable, one with the other, for sealing the slit along said slit portion to cover the pipe section and secure the cover piece to the pipe section;

a least one pair of opposing apertures, an aperture of the pair formed in each of the opposing, overlappable edges and positioned on the edge to be aligned with the other aperture when the edges overlap;

a fastener having an elongated portion, the fastener configured for being inserted into the apertures such that the elongated portion engages the overlapped edges in the aligned apertures and extends generally perpendicular to outer surfaces of the edges to secure the edges together and seal a portion of the slit;

whereby the cover piece provides complete insulative and protective coverage of a pipe section of a P-trap drain piping assembly.

18. An insulative cover assembly for insulating a pipe section of a P-trap drain piping assembly located under a sink including a straight pipe section, a J-shaped pipe section, and an L-shaped pipe section joined together at junctures by pipe nuts, the cover assembly comprising:

a cover piece having a generally elongated cylindrical body terminating in an approximately 180° bend at one end of said body, said elongated body being longitudinally slit along its length for being spread apart and positioned over said straight and J-shaped pipe sections joined at a juncture with said approximately 180° bend proximate said J-shaped pipe section;

the body of the cover piece being configured and dimensioned for continuously and simultaneously covering the joined straight and J-shaped pipe sections, the juncture and an associated pipe nut;

the body including opposing edges adjacent a portion of said longitudinal slit, said cover piece body dimensioned such that said opposing edges are overlappable, one with the other, for sealing the slit along said slit portion to cover the pipe section and secure the cover piece to the pipe section;

whereby the cover piece provides complete insulative and protective coverage of a pipe section of a P-trap drain piping assembly.

19. The insulative cover assembly of claim 18 further comprising a second cover piece having a generally elongated cylindrical body terminating in an approximately 90° bend at one end of said second cover piece body, said elongated second cover piece body being longitudinally slit along its length for being spread apart and positioned over said L-shaped pipe section joined at a juncture with an end of said J-shaped pipe section, a portion of said second cover piece body proximate the 90° bend configured for operably coupling with a portion of the first cover piece body proximate the 180° bend such that the second cover piece completely covers the L-shaped pipe section, the juncture between the L-shaped pipe section and the J-shaped pipe section and the respective pipe nut;

whereby the first and second cover pieces provide complete insulative and protective coverage of the P-trap drain piping assembly.

20. The insulative cover assembly of claim 17 further comprising a stand-off structure extending radially inwardly from an edge such that when the edges are overlapped the stand-off structure extends from an innermost overlapped edge for engaging the covered pipe section and spacing said overlapped edges from the pipe section.

21. An insulative cover assembly for insulating a P-trap drain piping assembly located under a sink including a straight pipe section, a J-shaped pipe section, and an L-shaped pipe section joined together at junctures by pipe nuts, the cover assembly comprising:

a unitary piece having a generally elongated body of cylindrical cross section terminating at in an approximately 180° bend at one end of said body and terminating in an approximately 90° bend at another end of said body, said elongated body including a generally linear portion between said bends and being longitudinally slit along its length for being spread apart;

the unitary piece being severable at a position along the linear portion to form two distinct cover pieces for covering the pipe sections;

the two distinct cover pieces comprising a unitary first cover piece having a generally elongated body with a cylindrical cross section and terminating in an approximately 180° bend at one end of said body, said elongated body being longitudinally slit along its length for being spread apart and positioned over said straight and J-shaped pipe sections joined at a juncture with said approximately 180° bend proximate said J-shaped pipe section;

the body of the unitary first cover piece being configured and dimensioned for continuously and simultaneously covering the joined straight and J-shaped pipe sections, the juncture and an associated pipe nut;

the second cover piece having a generally elongated body with a cylindrical cross section and terminating in an approximately 90° bend at one end of said second cover piece body, said elongated second cover piece body being longitudinally slit along its length for being spread apart and positioned over said L-shaped pipe section joined at a juncture with an end of said J-shaped pipe section, a portion of said second cover piece body proximate the 90° bend configured for operably coupling with a portion of said first cover piece body proximate the 180° bend such that the second cover piece completely covers the L-shaped pipe section, the juncture between the L-shaped pipe section and the J-shaped pipe section and the respective pipe nut;

whereby the first and second cover pieces provide complete insulative and protective coverage of the P-trap drain piping assembly.

\* \* \* \* \*

UNITED STATES PATENT AND TRADEMARK OFFICE
CERTIFICATE OF CORRECTION

PATENT NO. : 5,564,463

DATED : October 15, 1996

INVENTOR(S) : John A. Helmsderfer

It is certified that error appears in the above-identified patent and that said Letters Patent is hereby corrected as shown below:

In column 2, line 15, "sing" should be --sink--.

In column 5, line 57, "wall 4" should be --wall 41--.

In column 7, line 43, "a pip sections" should be --a pipe section--.

In column 8, line 6, "ben" should be --bend--.

Signed and Sealed this

Twenty-ninth Day of April, 1997

*Attest:*

BRUCE LEHMAN

*Attesting Officer*     *Commissioner of Patents and Trademarks*